United States Patent [19]

Faas et al.

[11] Patent Number: 4,466,817
[45] Date of Patent: Aug. 21, 1984

[54] EXHAUST GAS SEPARATOR

[75] Inventors: Harald Faas, Remshalden-Geradstetten; Ditrich Lenzen, Sachsenheim; Hans Weik; Albrecht Ostermann, both of Öhringen; Wolfgang Reimann, Schwieberdingen, all of Fed. Rep. of Germany

[73] Assignee: Knecht Filterwerke GmbH, Stuttgart, Fed. Rep. of Germany

[21] Appl. No.: 390,369

[22] Filed: Jun. 21, 1982

Related U.S. Application Data

[63] Continuation-in-part of Ser. No. 281,561, Jul. 8, 1981, abandoned.

[30] Foreign Application Priority Data

Jul. 19, 1980 [DE] Fed. Rep. of Germany ....... 3027499

[51] Int. Cl.³ .............................................. B01D 45/12
[52] U.S. Cl. ........................................ 55/455; 55/485; 55/DIG. 30; 422/171; 422/180
[58] Field of Search ................. 55/348, 447, 453, 455, 55/456, 457, 485, 523, DIG. 20, DIG. 30; 110/119, 216, 217; 422/180, 171; 60/311

[56] References Cited

U.S. PATENT DOCUMENTS

| 2,009,469 | 7/1935 | Anderson et al. | 55/455 |
| 2,598,603 | 5/1952 | Richarsic | 55/523 |
| 2,774,444 | 12/1956 | Soddy | 55/447 |
| 2,837,169 | 6/1958 | Sawyer | 55/456 |
| 3,811,845 | 5/1974 | Nakamura | 422/173 |

FOREIGN PATENT DOCUMENTS

| 44398 | 1/1982 | European Pat. Off. | 60/311 |
| 935360 | 8/1963 | United Kingdom | 55/455 |

Primary Examiner—David L. Lacey
Attorney, Agent, or Firm—Murray, Whisenhunt and Ferguson

[57] ABSTRACT

An exhaust gas separator for an internal combustion engine comprises an elongate housing (10) having an inlet (11) and an outlet (12), and annular disks (13) disposed within said housing between said inlet and outlet. Each disk is provided on both side surfaces with at least one open flow channel (14) which extends in the form of a spiral between the external periphery of the disk and its interior to provide communication between the exterior of the disk and its interior opening (19). The annular disks are arranged in a series and bear axially one against the other whereby the abutting side surfaces of adjacent disks serve to close the flow channels in said side surfaces. The spiral form of one of the flow channels in the abutting surfaces extending in the opposite sense to the spiral form in the other of said abutting surfaces whereby said flow channels in said abutting surfaces intersect each other at numerous positions (20). The fluid flowing in one channel can enter the adjacent channel of the next disk thereby producing numerous eddies in the fluid and the fluid in effect is subjected to contractions and increases in the flow cross-section.

6 Claims, 3 Drawing Figures

EXHAUST GAS SEPARATOR

REFERENCE TO RELATED APPLICATIONS

This application is a continuation-in-part of U.S. application Ser. No. 281,561 filed July 8, 1981 and now abandoned.

BACKGROUND TO THE INVENTION

The invention relates to an exhaust gas separator for internal combustion engines, more especially for the separation of soot, wherein the exhaust gas is fed at a high temperature to a reactor chamber, in which it is guided over temperature-resistant and possibly also catalytically acting installation bodies having as large a specific surface as possible.

STATEMENT OF PRIOR ART

Exhaust gas separators of this kind are known, for example from German Specification DE OS No. 26 58 892 and DE OS No. 28 35 741.

OBJECT OF THE INVENTION

Particularly with respect to the subject matter of the last-mentioned document, the object of the invention is to enlarge with constructionally simple means the specific surface of the components installed in the filter housing. Another object is to guide the exhaust gases in the installed components in such a way that any solid particles contained in the exhaust gas, such as soot, are caused to be deposited on the installed components by centrifugal and adhesive forces.

SUMMARY OF THE INVENTION

According to the invention there is provided an exhaust gas separator for an internal combustion engine comprising an elongate housing having an inlet and an outlet, and annular disks disposed within said housing between said inlet and outlet, each disk being provided on both side surfaces with at least one open flow channel which extends in the form of a spiral between the external periphery of the disk and its interior to provide communication between the exterior of the disk and its interior opening, said annular disks being arranged in a series and bear axially one against the other whereby the abutting side surfaces of adjacent disks serve to close the flow channels in said side surfaces, the spiral form of one of the flow channels in the abutting surfaces extending in the opposite sense to the spiral form in the other of said abutting surfaces whereby said flow channels in said abutting surfaces intersect each other at numerous positions.

The annular disks according to the invention expediently consist of a ceramic material.

Each annular disk advantageously has, at least on one side, four to six channels.

Depending on the required flow cross-section, which results from the summation of the individual channel cross-sections, a corresponding number of annular disks are installed in the reaction chamber of the separator housing for the formation of a uniform installation body. Depending on the design of the separator, the exhaust gas can radially flow through the disks either from the inside to the outside or from the outside to the inside. For optimum flow conditions in the separator, it is expedient to stagger the radial inlet and outlet ports of the channels, with the annular disks in abutting contact with one another. As a rule, the annular disks, which have been jointed to form a joint installation body, will each have the same number of spiral channels. However, in specific cases, it may be expedient to join annular disks in which the number of spiral channels varies.

Both sides of the annular disks are provided with channels, and the channels of adjacent annular surfaces do not lie one upon the other in coincidence; on the contrary, for a functional improvement, the arrangement is such that the channels of one surface intersect the channels of the abutting surface. The flow cross-sections, therefore, change in size along the length of the region of intersection. A change of the flow cross-sections over the channel length can also be brought about by a variation of the walls forming the channel, which walls may, for example, be provided with projections. A particularly effective measure consists in allowing the channel to widen in the flow direction in the manner of a diffuser.

Ceramic material is particularly suitable for the annular disks since it is heat-resistant and also has a good heat capacity. For, in the case of exhaust-gas separators, particularly those intended for the separation of soot, the action of the separator depends to a very substantial degree on the maximum temperature that can be attained in the reaction chamber.

The soot is removed by burning in the separator according to the invention. However, burning is only possible after the high temperature that is necessary for such burning has been reached in the exhaust-gas separator. In a part-load operation of a motor vehicle internal-combustion engine, the exhaust gas has, however, not always the high temperatures which are required for burning the soot off. In these operational conditions, it is important initially to cause the soot to be deposited on the surfaces of the components installed in the reaction chamber of the separator and then to burn it off under load conditions of the engine, which generate sufficiently high exhaust-gas temperatures.

In order to improve the deposition of soot on the surfaces of the installation parts of the reactor, it may be expedient to roughen or coat the surface. Over and above this, it may be expedient to cover the surfaces with catalytically acting substances. The catalytic action can be fixed in different ways, so that there is not only an improvement in the burning of soot but it is also possible to decompose other harmful substances in the exhaust gas.

BRIEF DESCRIPTION OF THE DRAWINGS

An exemplified embodiment of the invention is diagrammatically shown in the drawings, in which.

DESCRIPTION OF THE PREFERRED EMBODIMENT

Figure 1:
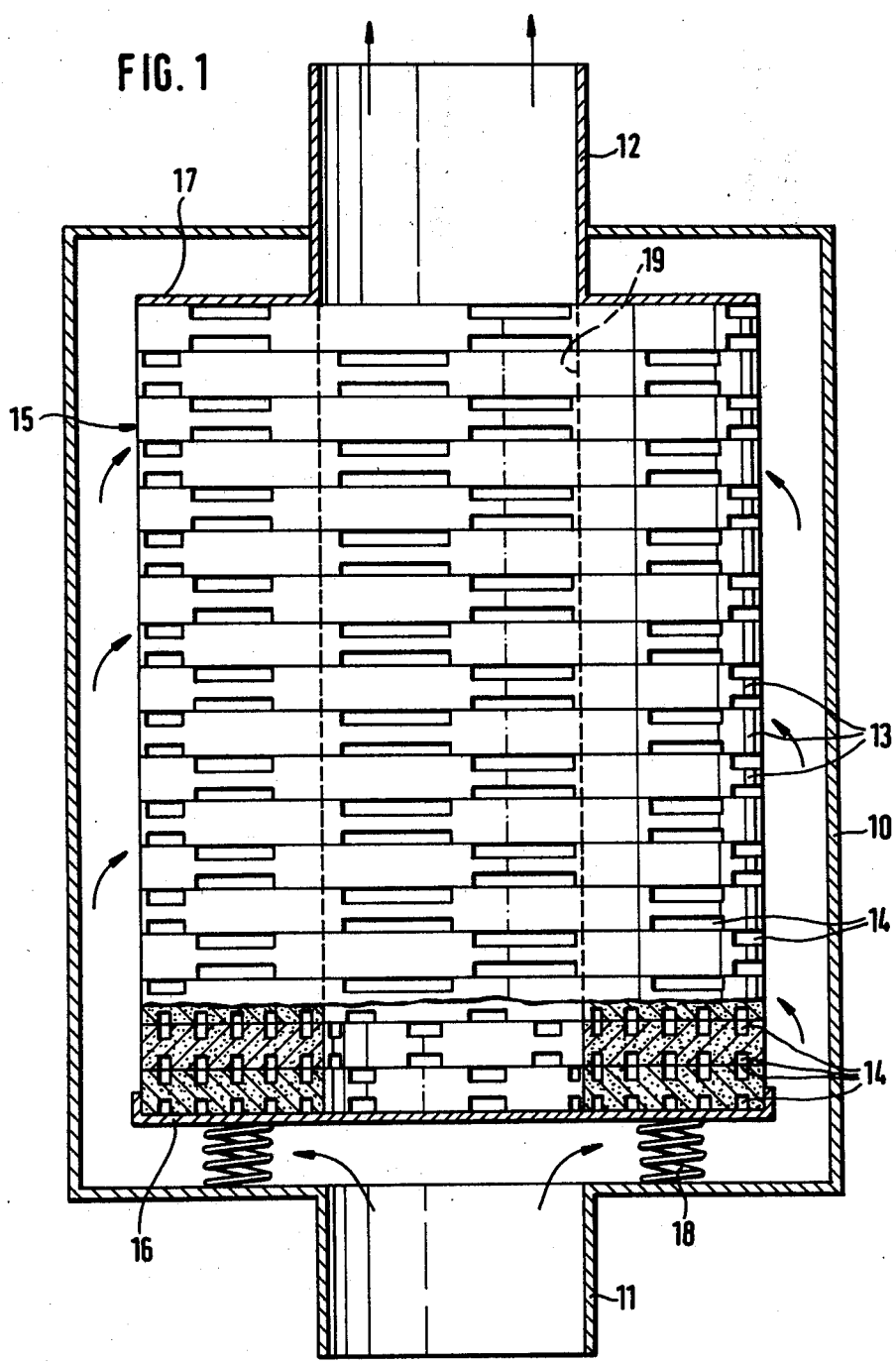
FIG. 1 shows a longitudinal section through an exhaust-gas separator constructed according to the invention.
Figure 2:
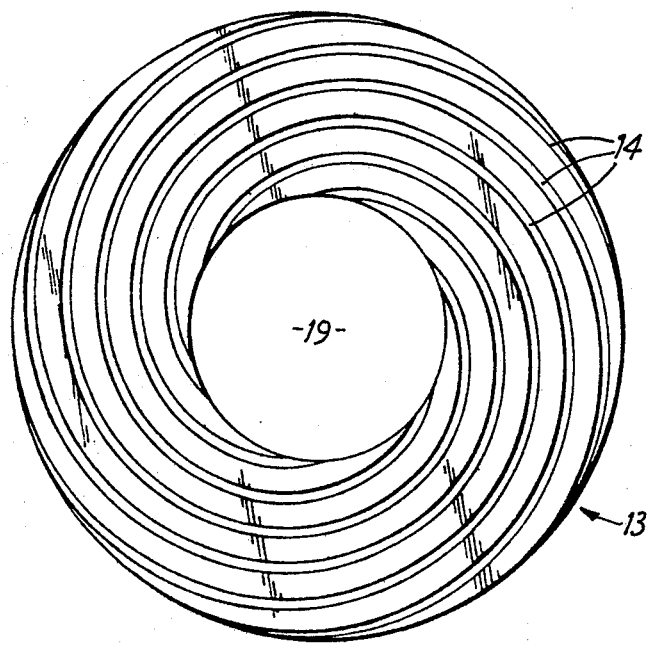
FIG. 2 shows one side of a separator disk.

The embodiment comprises a housing 10 having an inlet 11 and an outlet 12 respectfully at the ends of the housing. Individual annular disks 13 with spiral flow channels 14 are arranged in a series to form a stack 15 held between support plates 16, 17. Springs 18 serve to compress the disks together in tight abutting relationship.

The flow channels 14 comprise grooves formed in the side surfaces of the disks which open at their ends into the inner and outer peripheral surfaces of the disks. In use the exhaust gas to be purified enters the inlet 11 and passes through the stack 15 radially from the outside to the inside, the purified exhaust gas leaving the central openings 19 of the disks and finally from the outlet 12. Both sides of each disk in the example are formed with six spiral flow channels 14. As viewed from opposite sides of the disk the channels on one side surface extend in the opposite sense to the spiral direction of the channels on the other side surface. Though not essential, the channels are so positioned that as viewed from one side only, the channels in one side surface of the disk lie directly over the channels in the other side surface. The disks, which are all identical with each other, are arranged with alternate disks turned over, and this results in the channels on one disk intersecting the channels of the adjacent disk at numerous positions 20.

The annular disks are preferably angularly displaced in relation to one another whereby the radially inner ends of the flow channels of each disk are offset from the inner ends of the flow channels of the adjacent disk and the radially outer ends of the flow channels of each disk are offset from the outer ends of the flow channel of the adjacent disk, considered axially of the disks.

Figure 3:
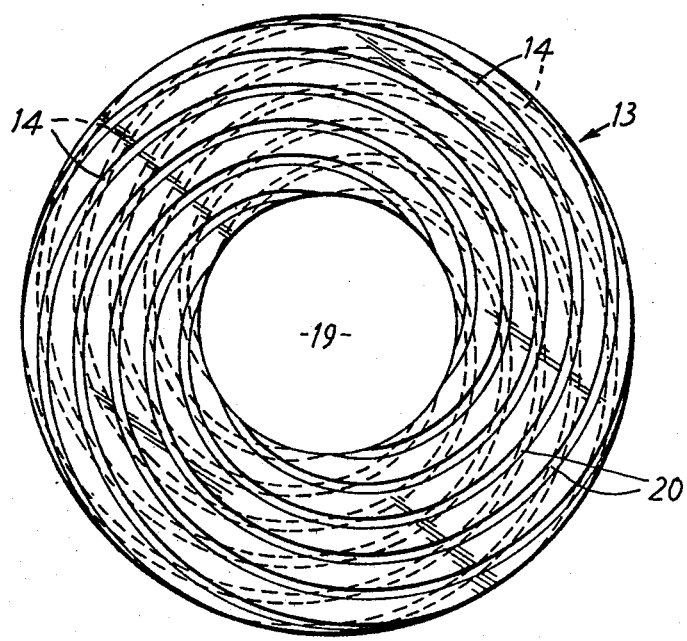
FIG. 3 shows the other side of the same disk.

The positions of intersection are seen in FIG. 3 in which the channels of the adjacent disk are shown in dashed lines. Thus the fluid flowing in one channel can enter the adjacent channel of the next disk thereby producing numerous eddies in the fluid and the fluid in effect is subjected to contractions and increases in the flow cross-section.

We claim:

1. An exhaust gas separator for an internal combustion engine comprising:
   (a) an elongate housing having an inlet and an outlet, and
   (b) annular disks disposed within said housing between said inlet and outlet,
   (c) each of said annular disks being provided on both side surfaces with at least one open flow channel which extends in the form of a spiral between the external periphery of each disk and its interior to provide communication between the exterior of each disk and its interior opening,
   (d) said annular disks being arranged in a series and bear axially one against the other whereby the abutting side surfaces of adjacent disks serve to close the flow channels in said side surfaces,
   (e) the spiral form of one of the flow channels in one of said abutting side surfaces extending in the opposite sense to the spiral form in the other of said abutting side surfaces whereby said flow channels in said abutting side surfaces intersect each other at numerous positions.

2. An exhaust gas separator according to claim 1, wherein each side surface of each of said annular disks is provided with a plurality of said flow channels.

3. An exhaust gas separator according to claim 2, wherein the annular disks are angularly displaced in relation to one another whereby the radially inner ends of the flow channels of each of said annular disks are offset from the inner ends of the flow channels of the adjacent disk and the radially outer ends of the flow channels of each of said annular disks are offset from the outer ends of the flow channel of the adjacent disk.

4. An exhaust gas separator according to claim 1, wherein each of said annular disks has, at least on one side surface, at least four of said flow channels.

5. An exhaust gas separator according to claim 1, wherein in each of said annular disks the flow channel on one side surface lies directly over the flow channel on the other side surface.

6. An exhaust gas separator according to claim 1, wherein the annular disks consist of a ceramic material.

* * * * *